US010635726B2

(12) United States Patent
Lin

(10) Patent No.: US 10,635,726 B2
(45) Date of Patent: Apr. 28, 2020

(54) DATA PROCESSING CIRCUIT AND DATA PROCESSING METHOD

(71) Applicant: Silicon Motion, Inc., Jhubei, Hsinchu County (TW)

(72) Inventor: Jiyun-Wei Lin, Hsinchu (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 425 days.

(21) Appl. No.: 15/408,659

(22) Filed: Jan. 18, 2017

(65) Prior Publication Data

US 2017/0364591 A1 Dec. 21, 2017

(30) Foreign Application Priority Data

Jun. 20, 2016 (TW) .............................. 105119276 A

(51) Int. Cl.
*G06F 16/951* (2019.01)
(52) U.S. Cl.
CPC .................................. *G06F 16/951* (2019.01)
(58) Field of Classification Search
CPC ...................................................... G06F 16/951
See application file for complete search history.

(56) References Cited

U.S. PATENT DOCUMENTS

| 6,640,220 | B1 * | 10/2003 | Firlit | ................ | G06F 16/90339 |
| 8,489,604 | B1 * | 7/2013 | Sadovsky | ............ | G06F 16/951 |
| | | | | | 707/737 |
| 9,563,551 | B2 | 2/2017 | Cheng | | |
| 2003/0033588 | A1 * | 2/2003 | Alexander | ............... | G06F 9/54 |
| | | | | | 717/107 |
| 2006/0136570 | A1 * | 6/2006 | Pandya | ................... | H04L 63/20 |
| | | | | | 709/217 |
| 2008/0195802 | A1 * | 8/2008 | Lee | ..................... | G06F 12/0246 |
| | | | | | 711/103 |
| 2010/0153436 | A1 | 6/2010 | Teufel et al. | | |
| 2012/0136849 | A1 * | 5/2012 | Niranjan | ............. | G06F 16/9537 |
| | | | | | 707/708 |
| 2014/0279995 | A1 * | 9/2014 | Wang | ................. | G06F 16/3334 |
| | | | | | 707/706 |
| 2015/0039909 | A1 | 2/2015 | Tseng et al. | | |

FOREIGN PATENT DOCUMENTS

| TW | 200828018 A | 7/2008 |
| TW | 201500923 A | 1/2015 |

* cited by examiner

*Primary Examiner* — Matthew J Ellis
(74) *Attorney, Agent, or Firm* — McClure, Qualey & Rodack, LLP

(57) ABSTRACT

A data processing circuit includes a condition input circuit and a search engine array. The condition input circuit receives and stores multiple search conditions corresponding to multiple data search tasks. The search engine array receives the search conditions and performs the data search tasks in a parallel manner according to the search conditions. The search engine array includes a storage medium and multiple search engines. The search condition(s) corresponding to one data search task is provided to one search engine and the search engine array accesses a random access memory to load the data stored in the random access memory into the storage medium. The search engines search the data stored in the storage medium according to the corresponding search condition(s) to perform the corresponding data search task, concurrently, and obtain a corresponding search result.

13 Claims, 5 Drawing Sheets

DATA PROCESSING CIRCUIT AND DATA PROCESSING METHOD

CROSS REFERENCE TO RELATED APPLICATIONS

This Application claims priority of Taiwan Patent Application No. 105119276, filed on Jun. 20, 2016, the entirety of which is incorporated by reference herein.

BACKGROUND OF THE INVENTION

Field of the Invention

The invention relates to a data processing circuit, and more particularly to a data processing circuit capable of processing multiple data search tasks in a parallel manner.

Description of the Related Art

With the rapid growth of data storage technology in recent years, many handheld data storage devices—such as memory cards manufactured in compliance with the SD/MMC standards, CF standards, MS standards or XD standards, as well as solid state hard drives, Embedded Multi Media Cards (eMMC) and Universal Flash Storage (UFS)—have been used widely for a variety of purposes. Therefore, effective control of access to these data storage devices is an important issue. Of especially great concern is how to effectively access the data storage device to speed up data searches.

Conventionally, it is necessary to confirm whether the data storage device is in a busy state or not before accessing the data storage device. If the data storage device is in a busy state, the data storage device will be accessible again only when the data storage device becomes idle. Therefore, when there are a number of different data search requests that must be performed, the acknowledgment-wait process described above will cause the system to suspend and cause undesirable system latency.

BRIEF SUMMARY OF THE INVENTION

A data processing circuit and data processing methods are provided. An exemplary embodiment of a data processing circuit coupled to a random access memory comprises a condition input circuit and a search engine array. The condition input circuit receives and stores a plurality of search conditions required by a plurality of data search tasks. The search engine array is coupled to the condition input circuit. The search engine array receives the search conditions and performs the data search tasks in a parallel manner according to the search conditions. The search engine array comprises a storage medium and a plurality of search engines. The search condition(s) corresponding to each data search task is/are provided to the search engines. The search engine array accesses the random access memory to load data stored in the random access memory into the storage medium. The search engines search the data stored in the storage medium according to the corresponding search condition(s) to perform the corresponding data search tasks, concurrently, and obtain a search result for each data search task.

An exemplary embodiment of a data processing method, suitable for a data processing circuit coupled to a random access memory, comprises: receiving and storing a plurality of search conditions required by a plurality of data search tasks; providing the search condition(s) corresponding to each data search task to one of a plurality of search engines of the data processing circuit; accessing the random access memory to load data stored in the random access memory into a storage medium of the data processing circuit; concurrently search the data stored in the storage medium according to the corresponding search condition(s) by the search engines to perform the data search tasks in a parallel manner; and obtaining a search result for each data search task. The random access memory is accessed only one time when performing the data search tasks.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
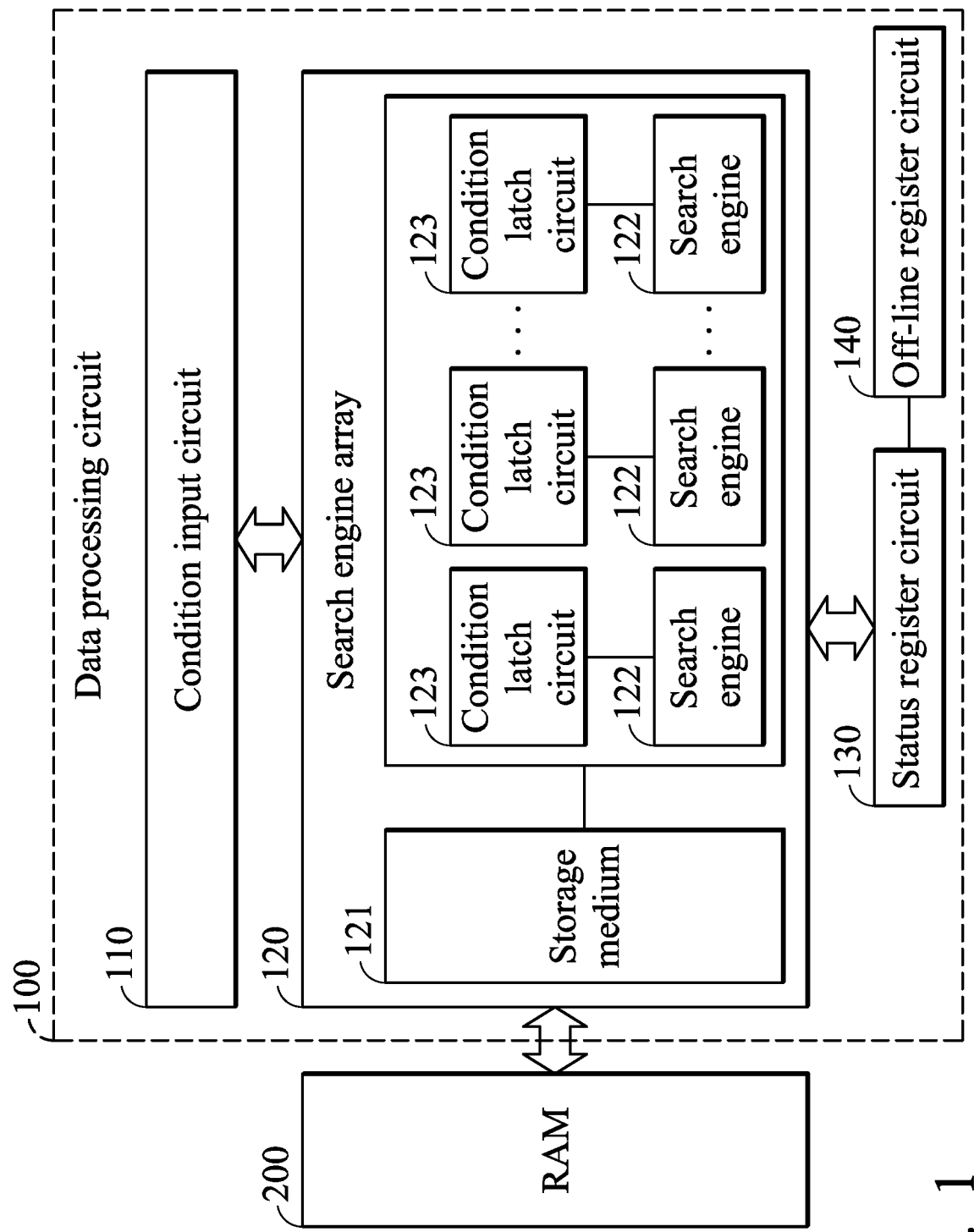
FIG. 1 is a block diagram of a data processing circuit according to an embodiment of the invention.

FIG. 1 is a block diagram of a data processing circuit according to an embodiment of the invention. The data processing circuit 100 is coupled to a Random Access Memory (RAM) 200 and comprises a condition input circuit 110, a search engine array 120, a status register circuit 130 and an off-line register circuit 140. The condition input circuit 110 receives a plurality of search conditions required by a plurality of data search tasks from a micro-processor, a direct memory access (DMA) circuit or any device and stores the search conditions. In the embodiments of the invention, there may be one or more search conditions required when performing a data search task. The micro-processor may be the processor of any electronic device or any system. For example, in an embodiment of the invention, the data processing circuit 100 may be implemented inside of a controller of a data storage device, and the micro-processor may be a micro-controller inside of the controller. However, the invention should not be limited thereto.

Since the condition input circuit 110 receives the search conditions from different devices, the search conditions may have different formats. Therefore, according to an embodiment of the invention, the condition input circuit 110 may further comprise one or more converting circuits for converting the formats of the received search conditions into a uniform format.

The search engine array 120 may be coupled to the condition input circuit 110 for receiving the search conditions and performing the data search tasks according to the search conditions in a parallel manner. According to an embodiment of the invention, performing the data search tasks in a parallel manner means that multiple data search tasks can be concurrently performed or can be performed at the same time. The search engine array 120 comprises a storage medium 121, a plurality of search engines 122 and a plurality of corresponding condition latch circuits 123. The storage medium 121 may be any type of storage device for storing the data loaded from the RAM 200. According to an embodiment of the invention, the search engine array 120 may have a corresponding hardware device, such as a memory access circuit, for loading the data stored in the RAM 200 into the storage medium 121 of the search engine array 120.

Each condition latch circuit 123 retrieves or receives one or more search conditions corresponding to one data search task from the condition input circuit 110. According to an embodiment of the invention, one or more search engines 122 and condition latch circuit 123 may be configured to perform a data search task. The content and complexity of the data search task may be flexibly designed based on the system or micro-processor's requirements. The condition latch circuit 123 provides the one or more search conditions to the corresponding search engine 122. The search engine 122 may access data stored in the storage medium 121 according to the corresponding search condition(s) to perform the corresponding data search task. As an example, the search engine 122 may access the data stored in a predetermined address region according to the data address set by the corresponding search condition(s) to perform the corresponding data search task.

In addition, according to an embodiment of the invention, the search engines 122 may further comprise a corresponding internal storage medium. The search engines 122 may access the data stored in the storage medium 121 according to the corresponding search condition(s) and copy or load the data or a portion of the data into the internal storage medium.

According to an embodiment of the invention, the search engines 122 can concurrently perform the corresponding data search task by searching the data stored in the storage medium 121 or searching the data stored in the internal storage medium of the search engine 122 according to the corresponding search condition(s), so as to obtain a corresponding search result. The search result may be presented in different forms based on the content of the data search tasks. As an example, when the content of a data search task is to check whether a target value exists or not, the search result may be represented by a flag to indicate whether the target value is stored in the RAM 200 or not, or an address to indicate the address of the target value stored in the RAM. In another example, when the content of a data search task is to sort the data in a predetermined order, the search result may be the sorted data that has been sorted according to the search condition(s).

In addition, according to an embodiment of the invention, one of the search engines 122 may also process data according to the corresponding search condition(s), and store the processed data in the internal storage medium. The processed data may be shared by multiple search engines 122. When the other search engine 122 needs the processed data for performing the corresponding data search task, the search engine may directly access the processed data such that duplicated computation or data processing can be saved.

The search engine 122 may output the search result to the status register circuit 130. The status register circuit 130 is coupled to the search engine array 120 for storing the search result corresponding to each data search task. For example, each data search task may have a corresponding identification number. The search result of the data search task may be linked to the corresponding identification number.

The off-line register circuit 140 may be coupled to the status register circuit 130 for receiving the previously obtained search result. In the embodiments of the invention, the status register circuit 130 may store several of the latest search results. When the status register circuit 130 receives other new search results, the stored search results may be transmitted to the off-line register circuit 140 and stored in the off-line register circuit 140.

In the conventional design, the data storage device is only accessible when it is idle. Therefore, when any device needs to access or search the data stored in the data storage device at the time when the data storage device is busy, the device has to wait until the data storage device becomes idle to perform the data access or search task. However, unlike the conventional design, in the embodiments of the invention, regardless of whether the data storage device is busy or not, when the micro-processor, the DMA circuit or any device needs to access or search the data stored in the data storage device, the micro-processor, the DMA circuit or the device only has to transmit the search condition(s) to the condition input circuit 110. Then, the micro-processor, the DMA circuit or the device can perform other task(s). After a predetermined time period, the micro-processor, the DMA circuit or the device may query the status register circuit 130 or the off-line register circuit 140 to check whether there is any search result obtained. For example, the micro-processor, the DMA circuit or the device may query the status register circuit 130 according to the identification number corresponding to the data search task. In this manner, the time cost by the acknowledgment-wait process in the conventional design can be saved.

In addition, in another embodiment of the invention, besides querying the search result by the device(s) that need(s) the search result in a passive way, the status register circuit 130 may also actively generate an interrupt signal according to the received search result to notify the device(s) of the search result. In this manner, the time cost by the acknowledgment-wait process in the conventional design can also be saved.

In addition, according to an embodiment of the invention, the search engine array 120 only accesses the RAM 200 one time when performing the data search tasks. Since the data stored in the RAM 200 is loaded to the storage medium 121, the search engine array 120 does not have to access the RAM 200 again as long as the data stored in the RAM 200 has not been changed. In this manner, even when there are multiple data search tasks that have to be performed at the same time, the time required to access the RAM 200 can be greatly reduced compared to the conventional design since in the conventional design, the RAM 200 will be accessed multiple times when there are multiple data search tasks that have to be performed. In addition, the utilization of the RAM 200 can also be minimized.

In addition, since there are a plurality of search engines 122 in the search engine array 120, each search engine 122 may copy or load the data or a portion of the data stored in the storage medium 121 into the internal storage medium according to the corresponding search condition(s). Therefore, the search engines 122 can concurrently perform the corresponding data search tasks. Compared to the conventional design, in which different data search tasks have to be performed sequentially in a time division manner, in the embodiments of the invention, the data search tasks can be performed concurrently in a parallel manner. Therefore, the data processing efficiency can be further improved.

Figure 2:
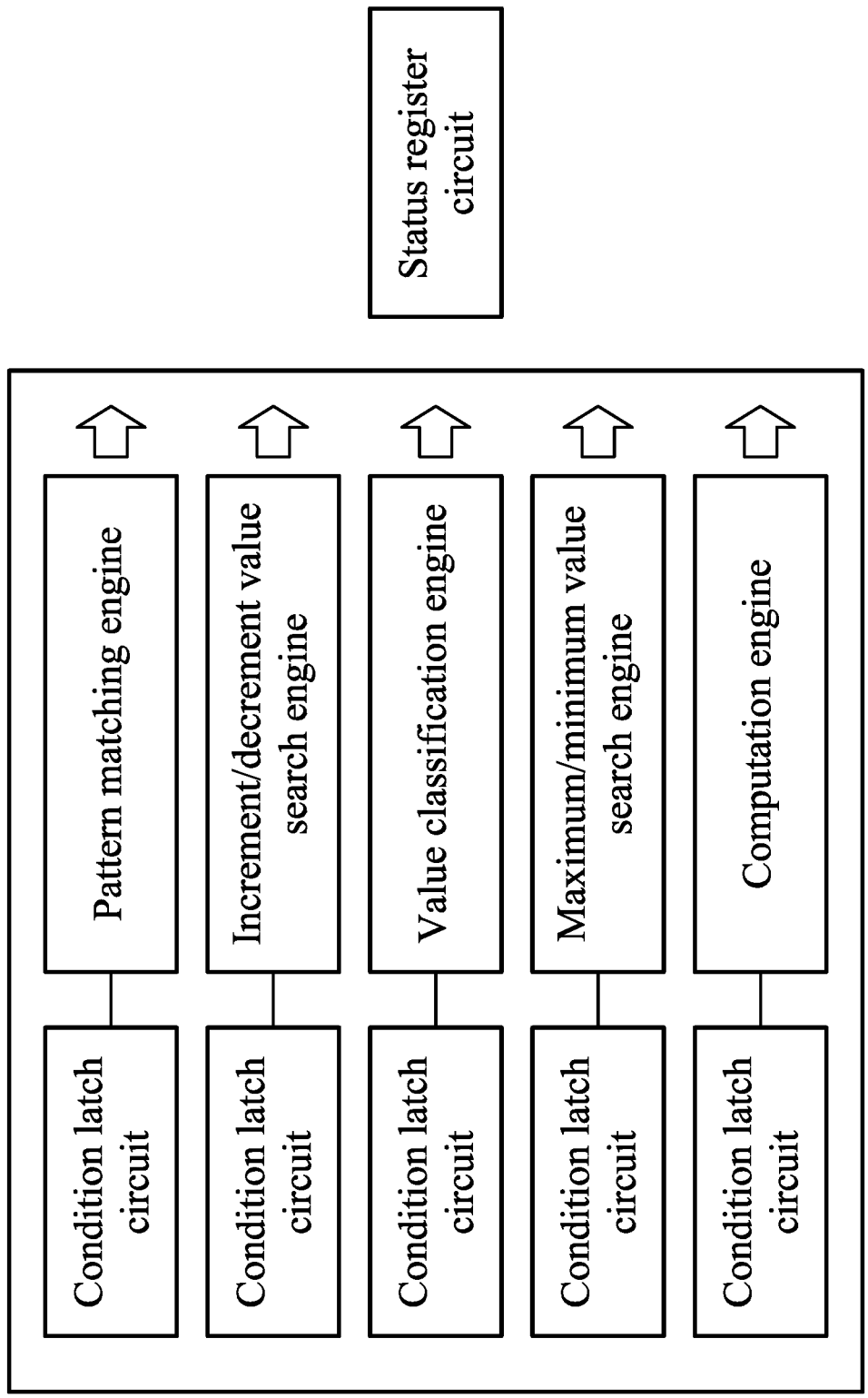
FIG. 2 is an exemplary schematic diagram of using multiple search engines to concurrently perform multiple data search tasks according to an embodiment of the invention.

FIG. 2 is an exemplary schematic diagram of using multiple search engines to concurrently perform multiple data search tasks according to an embodiment of the invention. As shown in FIG. 2, in this embodiment, the search engine array may comprise a plurality of different search engines for performing different types of searching tasks. As an example, the search engine array may comprise a pattern matching engine, an increment/decrement value search engine, a value classification engine, a maximum/minimum value search engine and a computation engine. Each engine may receive the search condition(s) from the corresponding condition latch circuit. The engines may process data and/or search data at the same time to obtain corresponding search results. The search result is output to the status register circuit.

As discussed above, in an embodiment of the invention, the data processing circuit may be implemented inside of the controller of a data storage device.

Figure 3:
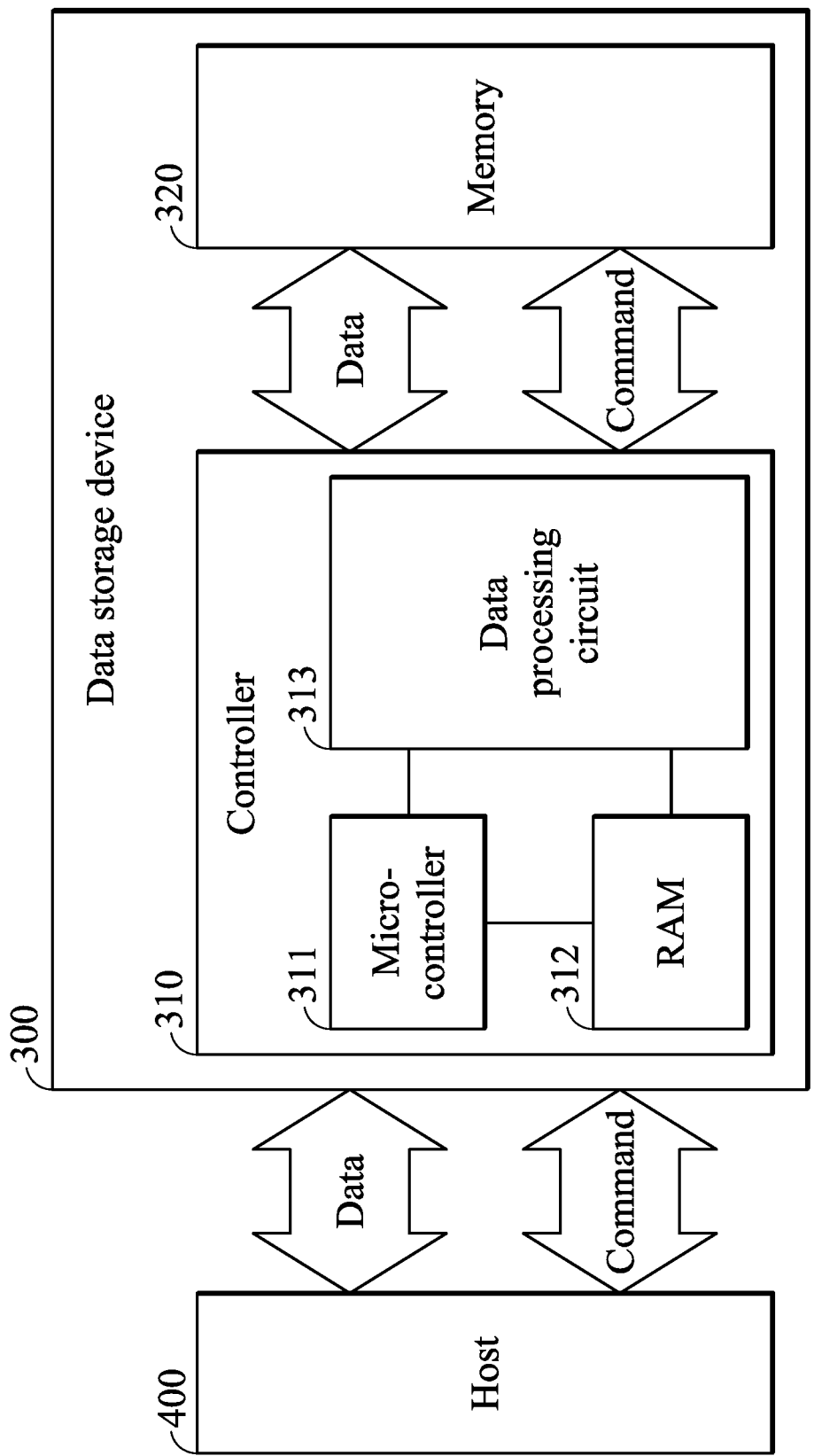
FIG. 3 is a schematic diagram of a data storage device according to an embodiment of the invention.

FIG. 3 is a schematic diagram of a data storage device according to an embodiment of the invention. In an embodiment, the data storage device 300 may comprise a controller 310 and a memory 320. The data storage device 300 may be coupled to a host 400 for transmitting data and commands thereto or receive data and commands therefrom. The memory 320 may be a non-volatile memory, such as an NADN flash. The host 400 may be a mobile phone, a tablet computer, a notebook, a navigator, an in-vehicle system, etc.

The controller 310 is coupled to the memory 320 for transmitting data and commands thereto or for receiving data and commands therefrom. To be more specific, the controller 310 may further comprise a micro-controller 311, a RAM 312 and the data processing circuit 313 discussed above. In the embodiment of the invention, when the micro-controller 311 is required to access or search the data stored in the RAM 312, the micro-controller 311 only needs to transmit the corresponding search condition(s) to the data processing circuit 313. After that, the micro-controller 311 can perform other tasks and wait for the interrupt signal, or for a predetermined time period to expire. The micro-controller 311 may obtain the search result from the data processing circuit 313 upon receiving the interrupt signal, or after the predetermined time period.

Figure 4:
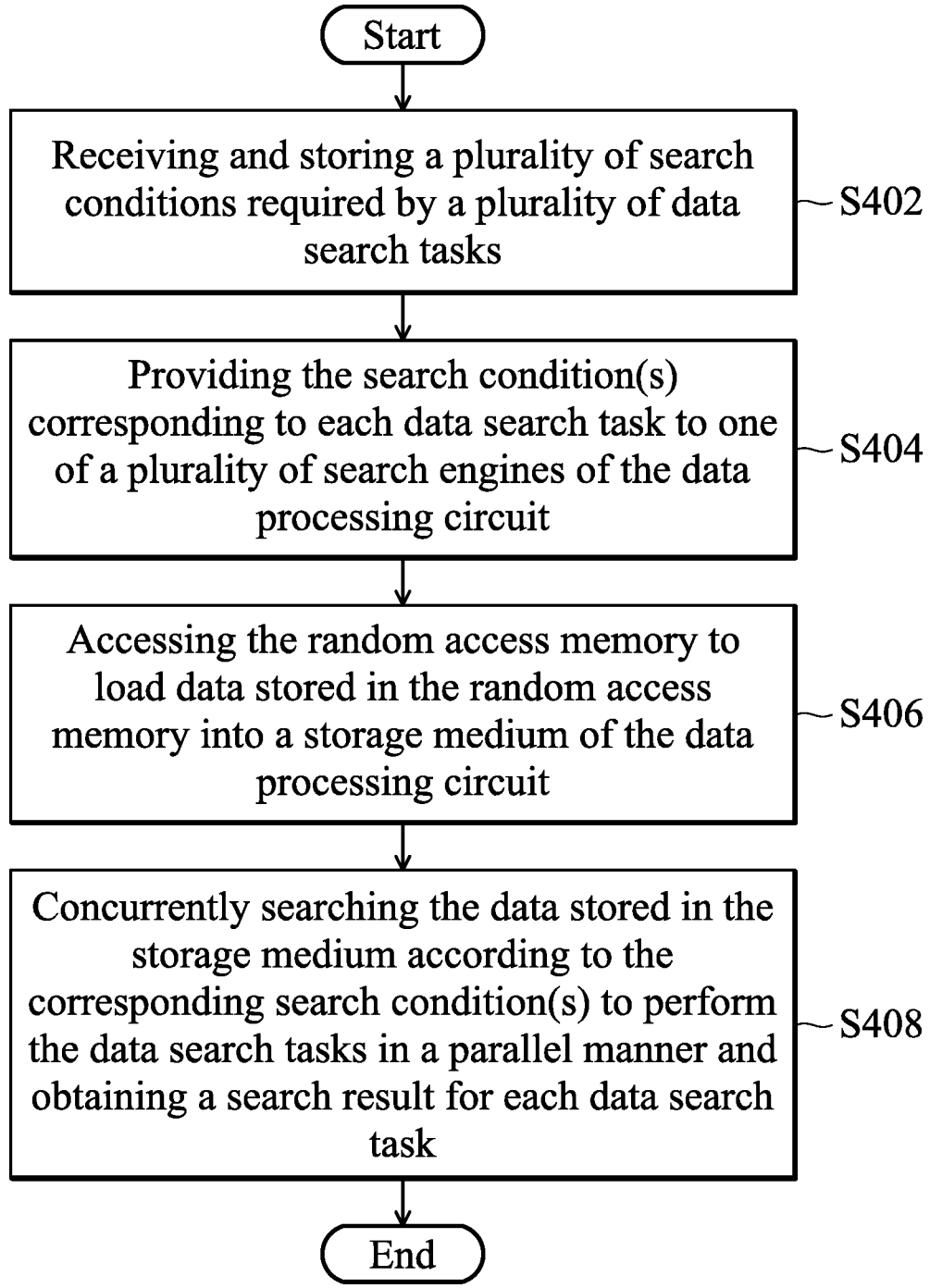
FIG. 4 shows a flow chart of a data processing method according to an embodiment of the invention.

FIG. 4 shows a flow chart of a data processing method according to an embodiment of the invention. The data processing method is suitable for a data processing circuit. First, the data processing circuit receives and stores a plurality of search conditions required by a plurality of data search tasks from a micro-processor or any device (Step S402). Next, the search condition(s) corresponding to each data search task is/are provided to one of a plurality of search engines of the data processing circuit (Step S404). Next, the random access memory is accessed to load data stored in the random access memory into a storage medium of the data processing circuit (Step S406). Next, the search engines concurrently search the data stored in the storage medium according to the corresponding search condition(s) to perform the data search tasks in a parallel manner and obtain a search result for each data search task (Step S408).

As discussed above, when the micro-processor or any device has a requirement to access or search the data, the micro-processor or the device only needs to transmit the corresponding search condition(s) to the data processing circuit. In this manner, the time cost by the acknowledgment-wait process in the conventional design can be saved.

In addition, since the data processing circuit only accesses the RAM one time when performing the data search tasks, the time required for accessing the RAM can be greatly reduced compared to the conventional design, and the utilization of the RAM 200 can also be minimized.

In addition, since there are a plurality of search engines in the data processing circuit, the search engines can perform the corresponding data search task concurrently. Therefore, the data processing efficiency can be improved further.

Figure 5:
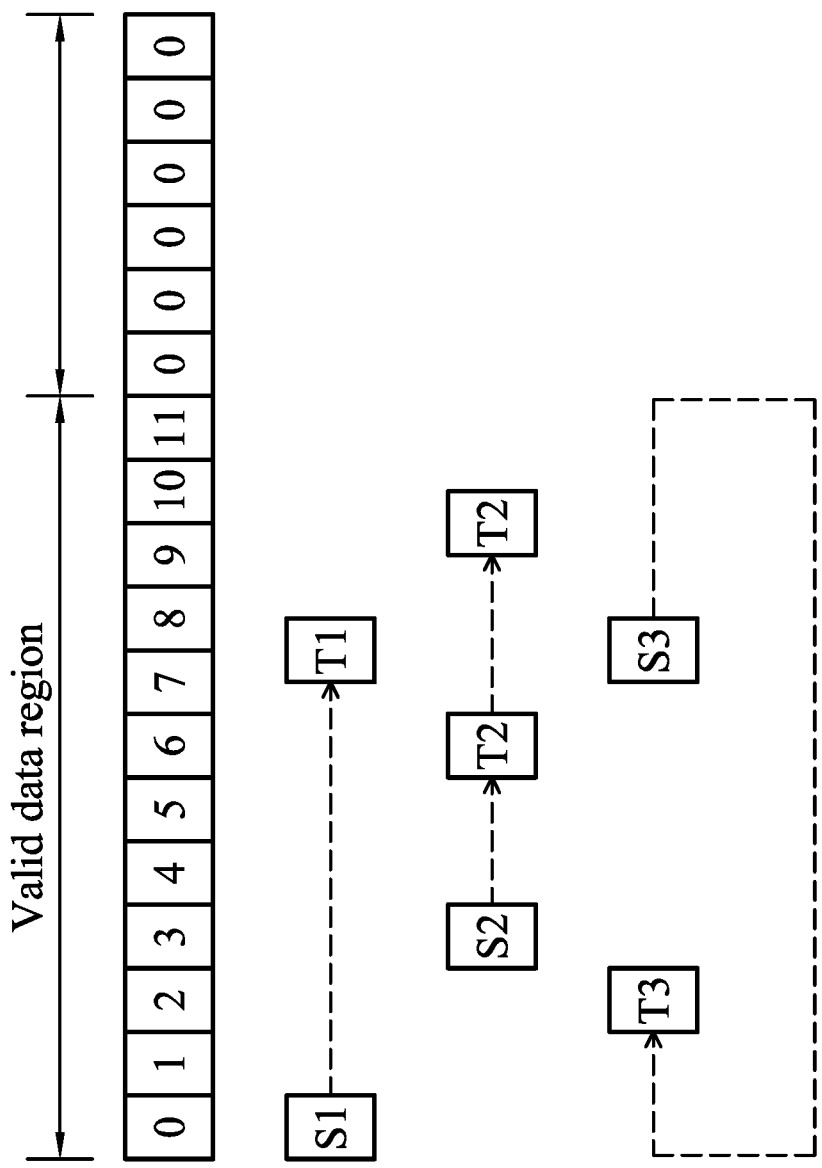
FIG. 5 is a schematic diagram showing the concept of concurrently processing multiple data search tasks according to an embodiment of the invention.

FIG. 5 is a schematic diagram showing the concept of concurrently processing multiple data search tasks according to an embodiment of the invention. As shown in FIG. 5, the search engines can perform data search according to the corresponding search conditions S1, S2 and S3 at the same time. The data search can be stopped when the corresponding target address T1, T2 or T3 has been found. Since the three data search tasks can be processed in a parallel manner, data processing efficiency can be greatly improved.

The term "couple" in the specification may refer to any kind of direct or indirect electrical connection. While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A data processing circuit, coupled to a random access memory, comprising:
 a condition input circuit, receiving and storing a plurality of search conditions required by a plurality of data search tasks, wherein one or more search conditions are required when performing a data search task; and
 a search engine array, coupled to the condition input circuit, receiving the search conditions and performing the data search tasks in a parallel manner according to the search conditions,
 wherein the search engine array comprises a storage medium and a plurality of search engines, the storage medium is shared by the search engines and the search conditions corresponding to each data search task are provided to the search engines, and
 wherein the search engine array accesses the random access memory to load data stored in the random access memory into the storage medium, and the search engines search the data stored in the storage medium according to the corresponding search conditions to perform the corresponding data search tasks, concurrently, and obtain a search result for each data search task, and
 wherein each search engine comprises an internal storage medium, and a first engine of the search engines further processes the data according to the search condition, and stores the processed data in the internal storage medium corresponding to the first search engine.

2. The data processing circuit as claimed in claim 1, further comprising:

a status register circuit, coupled to the search engine array and storing the search result corresponding to each data search task.

3. The data processing circuit as claimed in claim 1, wherein the search engine array only accesses the random access memory one time when performing the data search tasks.

4. The data processing circuit as claimed in claim 1, wherein one or more of the search engines further copies a portion of the data according to the corresponding search conditions to concurrently perform the corresponding data search tasks.

5. The data processing circuit as claimed in claim 1, wherein one of the search engines further processes the data to generate processed data according to the corresponding search conditions and shares the processed data with another of the search engines.

6. The data processing circuit as claimed in claim 2, wherein the condition input circuit receives at least one of the search conditions from a micro-processor and the status register circuit further generates an interrupt signal to notify the micro-processor of the search result after obtaining the search result corresponding to the at least one of the search conditions.

7. A data processing method, suitable for a data processing circuit coupled to a random access memory, comprising:
receiving and storing a plurality of search conditions required by a plurality of data search tasks, wherein one or more search conditions are required when performing a data search task;
providing the search conditions corresponding to each data search task to one of a plurality of search engines of the data processing circuit;
accessing the random access memory to load data stored in the random access memory into a storage medium of the data processing circuit, wherein the storage medium is shared by the search engines;
concurrently searching the data stored in the storage medium according to the corresponding search conditions by the search engines to perform the data search tasks in a parallel manner; and
obtaining a search result for each data search task, wherein the random access memory is accessed only one time when performing the data search tasks; and
wherein each search engine comprises an internal storage medium, and the method further comprises:
processing the data by a first engine of the search engines according to the corresponding search condition; and
storing the processed data in the internal storage medium corresponding to the first search engine.

8. The method as claimed in claim 7, wherein at least one of the search conditions is received from a micro-processor, and the method further comprises:
storing the search result corresponding to each data search task in a status register circuit of the data processing circuit, for the micro-processor to be able to query the status register circuit about the search result.

9. The method as claimed in claim 7, further comprising:
copying a portion of the data according to the corresponding search conditions by one or more of the search engines to enable the search engines to concurrently perform the corresponding data search tasks.

10. The method as claimed in claim 7, further comprising:
processing the data according to the corresponding search conditions to obtain processed data; and
sharing the processed data between the search engines.

11. The method as claimed in claim 7, further comprising:
generating an interrupt signal after obtaining the search result.

12. The data processing circuit as claimed in claim 1, wherein each search engine comprises an internal storage medium, and a first engine of the search engines further loads a portion of the data into the internal storage medium corresponding to the first engine according to the search conditions.

13. The method as claimed in claim 7, wherein each search engine comprises an internal storage medium, and the method further comprises:
loading, by a first engine of the search engines, a portion of the data into the internal storage medium corresponding to the first engine according to the search conditions.

* * * * *